(12) United States Patent
Gao et al.

(10) Patent No.: US 8,115,736 B2
(45) Date of Patent: Feb. 14, 2012

(54) BALL MOUSE

(75) Inventors: Fei Gao, Shenzhen (CN); Wen-Haw Tseng, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 398 days.

(21) Appl. No.: 12/399,990

(22) Filed: Mar. 9, 2009

(65) Prior Publication Data

US 2009/0231280 A1  Sep. 17, 2009

(30) Foreign Application Priority Data

Mar. 11, 2008  (CN) .......................... 2008 1 0300515

(51) Int. Cl.
*G06F 3/033* (2006.01)
*G09G 5/08* (2006.01)

(52) U.S. Cl. ...................................................... 345/164

(58) Field of Classification Search .......... 369/163–166; 345/163–166
See application file for complete search history.

(56) References Cited

U.S. PATENT DOCUMENTS

| 4,906,843 | A | * | 3/1990 | Jones et al. | .................... 250/221 |
| 5,095,303 | A |   | 3/1992 | Clark et al. | |
| 5,311,209 | A | * | 5/1994 | Lin | .............................. 345/165 |
| 2007/0188453 | A1 | * | 8/2007 | O'Sullivan | .................... 345/163 |

* cited by examiner

*Primary Examiner* — Joseph Haley
*Assistant Examiner* — Nicholas Lee
(74) *Attorney, Agent, or Firm* — Altis Law Group, Inc.

(57) ABSTRACT

A ball mouse includes a ball, two metallic encoder disks each defining a plurality of through holes, two drive rollers engaged with the ball and transferring motion of the ball to respective encoder disks, two electromagnetic signal generators for generating two electromagnetic signals, and two induced signal generators for generating two induced signals according to respective electromagnetic signals. One of the two electromagnetic signals is transmitted to one of the induced signal generators through the plurality of through holes of one of the encoder disks. The other of the two electromagnetic signals is transmitted to the other of the induced signal generators through the plurality of through holes of the other of the encoder disks.

16 Claims, 6 Drawing Sheets

BALL MOUSE

BACKGROUND

1. Technical Field

The present discloser relates to computer mice, and particularly to a ball mouse.

2. Description of Related Art

A ball mouse is a mechanical mouse. A conventional ball mouse includes a ball that can rotate in any direction, two rollers rolling against two sides of the ball, two slotted disks engaged with the two rollers respectively, two infrared light emitting diodes (LED) emitting light, and a double-chip phototransistor gathering light through slots defined by the slotted disks. The two rollers grip the ball and transfer movement from the ball. The two slotted disks rotate along the two rollers and interrupt light emitted by the LEDs, thus generating light pulses. The double-chip phototransistor converts the light pulses into electrical signals. The electrical signals are then sent to a computer system, and are converted into motion of a mouse pointer along X and Y axes on a display screen of the computer system. However, the slots in the slotted disks may accumulate lint and dust after extended usage. As a result, the ball mouse becomes insensitive.

Therefore, an improved ball mouse is needed to address the aforementioned deficiency and inadequacies.

DETAILED DESCRIPTION OF CERTAIN INVENTIVE EMBODIMENTS

Reference will now be made to the drawings to describe certain inventive embodiments of the present disclosure.

Figure 1:
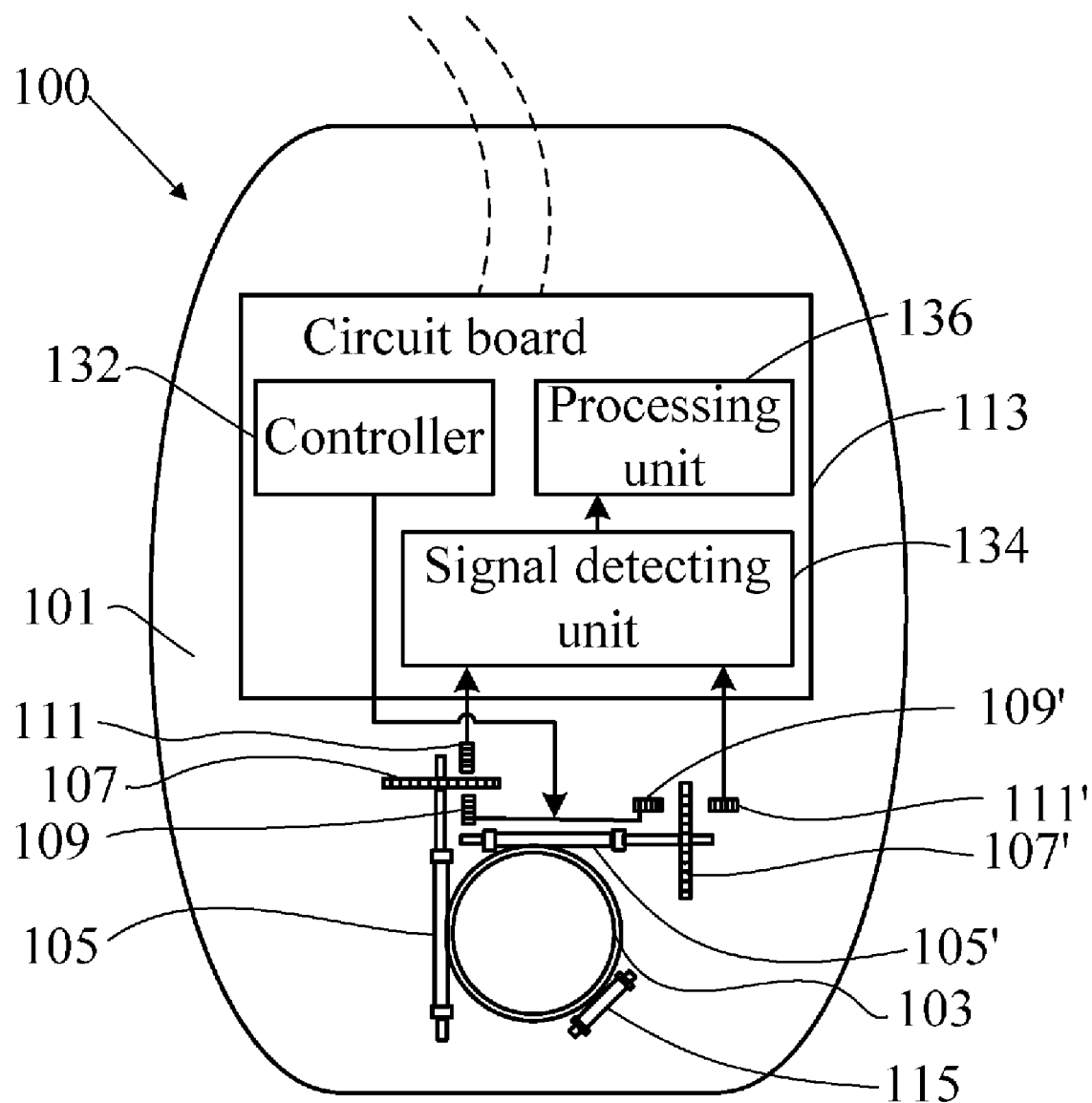
FIG. 1 is a schematic diagram showing an inner structure of a ball mouse in accordance with an embodiment of the present disclosure, wherein the ball mouse includes an encoder disk, an electromagnetic signal generator, and an induced signal generator.
Figure 2:
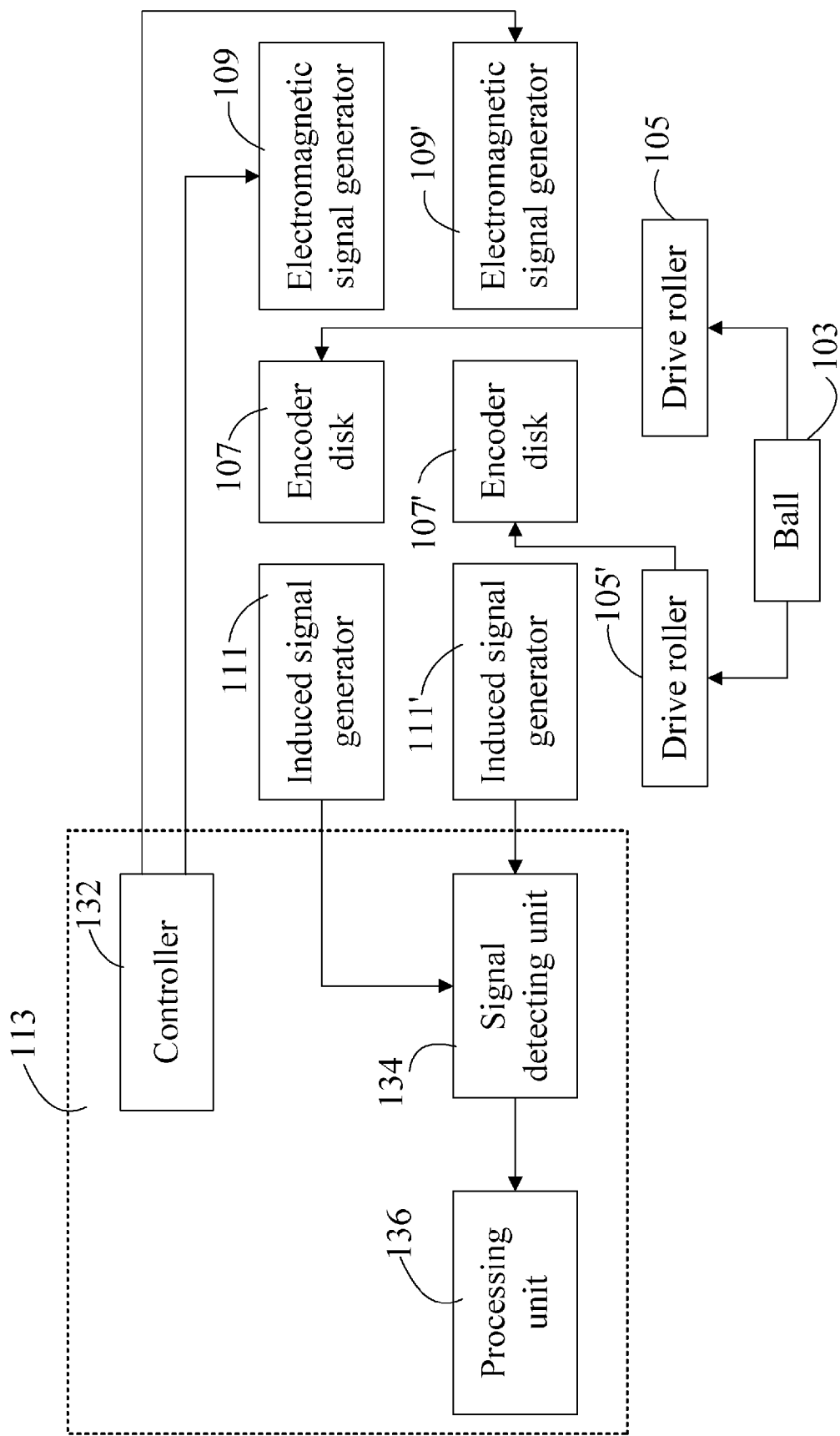
FIG. 2 is a block diagram showing the ball mouse of FIG. 1.

Referring to FIGS. 1 and 2, a ball mouse 100 in accordance with an exemplary embodiment includes a bottom casing 101, which accommodates a ball 103, two drive rollers 105, 105', two encoder disks 107, 107', two electromagnetic signal generators 109, 109', two induced signal generators 111, 111', a circuit board 113, and an idle roller 115.

The ball 103 is capable of rotating in any direction. The two drive rollers 105, 105', and the idle roller 115, which are fixed to the bottom casing 101, grip the ball 103, and are driven thereby to rotate when the ball 103 rotates. The drive roller 105 detects an X direction motion of the ball mouse 100, and the drive roller 105' detects a Y direction motion. The two encoder disks 107, 107' are sleeved on the two drive rollers 105, 105' respectively, and are non-rotatable with respect to the two drive rollers 105, 105'. When the ball 103 rotates, the drive rollers 105, 105' transfer the motion of the ball 103 to the encoder disks 107, 107'. The encoder disks 107, 107' are made of metallic material, such as copper, or iron.

Figure 3:
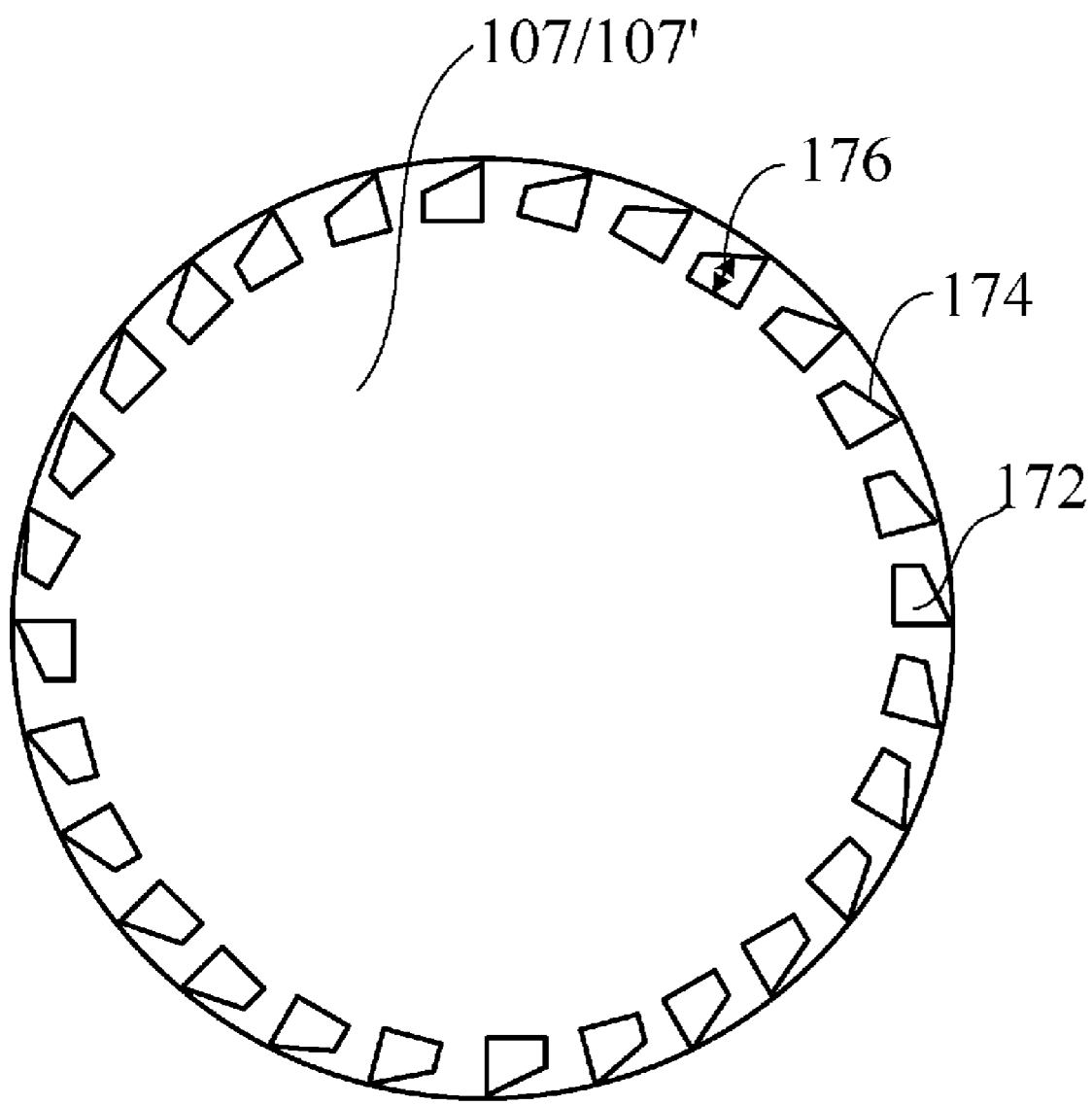
FIG. 3 is a schematic diagram showing the encoder disk of FIG. 1 in accordance with a first embodiment.

Referring also to FIG. 3, the encoder disk 107/107' defines a plurality of through holes 172 evenly distributed along a circumference of the encoder disk 107/107'. In this embodiment, each of the through holes 172 is a trapezoid 174. The trapezoid 174 has two parallel sides at right angles to a third side. The fourth sloping side of the trapezoid 174 faces the circumference of the encoder disk 107/107'. The parallel sides of the trapezoid 174 are perpendicular to the circumference of the encoder disk 107/107'. A radial width 176 of the through holes 172 is the distance measured from the third side to the sloping side of any one trapezoid 174 along a direction parallel to the two parallel sides. The radial width 176 of the through holes 172 changes with the slope of the sloping side of any one trapezoid 174.

The electromagnetic signal generator 109 and the induced signal generator 111 are disposed at opposite sides of the encoder disk 107. The electromagnetic signal generator 109' and the induced signal generator 111' are disposed at opposite sides of the encoder disk 107'. The electromagnetic signal generators 109, 109' each continuously generate an electromagnetic signal. In this embodiment, the electromagnetic signals from the electromagnetic signal generators 109, 109' are the same. Because the encoder disk 107/107' is metallic, the electromagnetic signal generated by the electromagnetic signal generator 109/109' is interrupted at intervals by the parts of the encoder disk 107/107' between the through holes 172 when the encoder disk 107/107' rotates, thus the induced signal generators 111, 111' each receive a discontinuous electromagnetic signal through the through holes 172. The induced signal generators 111, 111' each generate an induced signal according to respective discontinuous electromagnetic signal. Understandably, the induced signal is a discontinuous electromagnetic signal, too. Rotation rates of the encoder disk 107/107' can be determined according to a frequency of the discontinuity of the induced signal. A motion rate of the ball 103 can thus be determined.

The circuit board 113 is configured for driving the electromagnetic signal generators 109, 109', receiving the induced signals from the induced signal generators 111, 111', and converting the induced signals into electrical signals. The circuit board 113 includes a controller 132, a signal detecting unit 134, and a processing unit 136. The controller 132 is configured for generating a drive signal. The electromagnetic signal generators 109, 109' continuously generate the electromagnetic signals according to the drive signal. The signal detecting unit 134 is configured for extracting the induced signals from the induced signal generators 111, 111' and transmitting the induced signals to the processing unit 136. The processing unit 136 is configured for converting the induced signals into the electrical signals. Understandably, the electrical signals are then sent to a computer system (not shown), and are used to control motion of a mouse pointer along X and Y axes on a display screen of the computer system.

Figure 4:
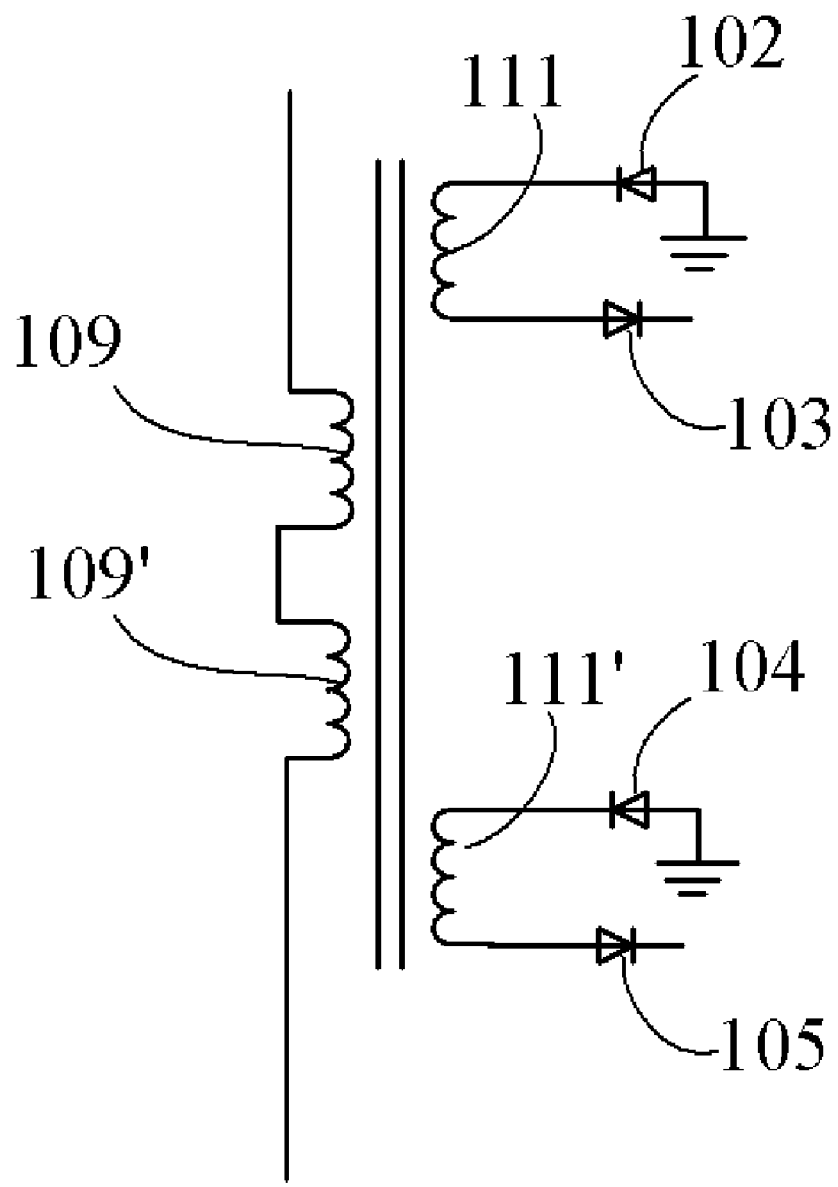
FIG. 4 is a circuit diagram of the electromagnetic signal generator and the induced signal generator.

Referring also to FIG. 4, in this embodiment, the electromagnetic signal generators 109, 109' and the induced signal generators 111, 111' compose a transformer. The electromagnetic signal generators 109, 109' include two primary windings of the transformer, and are connected in series. The induced signal generators 111, 111' include two separate secondary windings of the transformer. In other embodiments, the electromagnetic signal generators 109, 109' may be two separate primary windings.

The induced signal generators 111, 111' further include four diodes 102, 103, 104, 106 for rectifying the induced signals. The anode of the diode 102 is grounded. The cathode of the diode 102 is connected to a terminal of the induced signal generator 111. The other terminal of the induced signal generator 111 is connected to the anode of the diode 103. The cathode of the diode 103 is connected to the signal detecting unit 134 of the circuit board 113. The induced signal generator 111', the diodes 104, 106, and the signal detecting unit 134 are connected together in a similar way.

Take the encoder disk 107, the electromagnetic signal generator 109, and the induced signal generator 111 for example to describe how a moving direction of the ball mouse 100 is determined. In this embodiment, a length of the secondary winding of the induced signal generator 111 is equal to or longer than a maximum radial width 176 of the through holes 172. A length of the primary winding of the electromagnetic signal generator 109 is equal to or shorter than a minimum radial width 176 of the through hole 172. Thus, when the encoder disk 107 rotates, the radial width 176, corresponding to the electromagnetic signal generator 109 and the induced signal generator 111, changes (increases or decreases), and the induced signal (an induced voltage in this embodiment) generated by the induced signal generator 111 changes accordingly.

In operation, assuming the counterclockwise rotation of the encoder disk 107 is the forward direction of the ball mouse 100. When the encoder disk 107 rotates counterclockwise, the radial width 176 corresponding to the induced signal generator 111 decreases, thus the induced signal generated by the induced signal generator 111 decreases accordingly. Therefore, the ball mouse 100 is detected to move forward. When the encoder disk 107 rotates clockwise, the radial width 176 corresponding to the induced signal generator 111 increases, thus the induced signal generated by the induced signal generator 111 increases accordingly. Therefore, the ball mouse 100 is detected to move backward.

Figure 5:
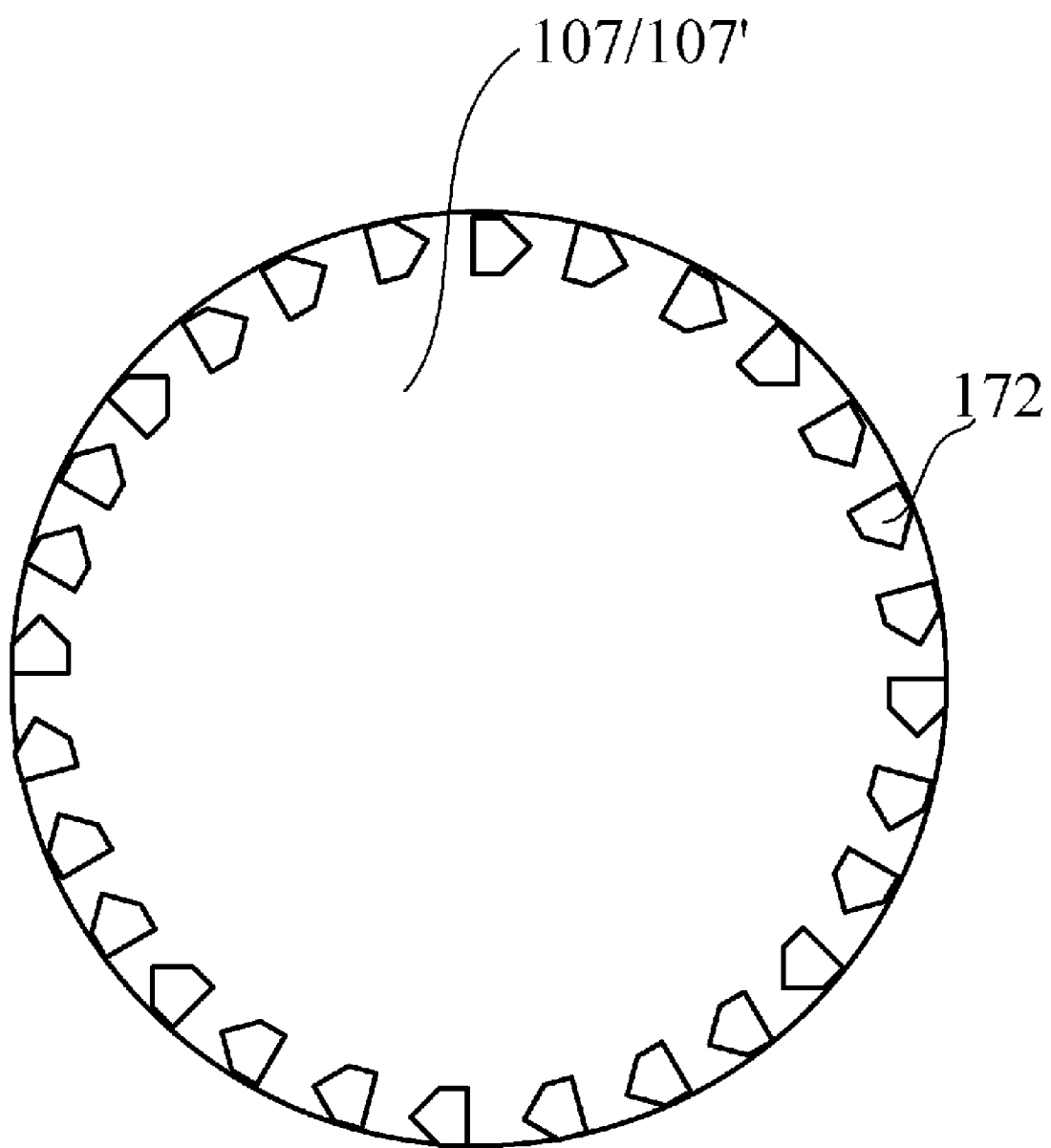
FIG. 5 is a schematic diagram showing the encoder disk of FIG. 1 in accordance with a second embodiment.
Figure 6:
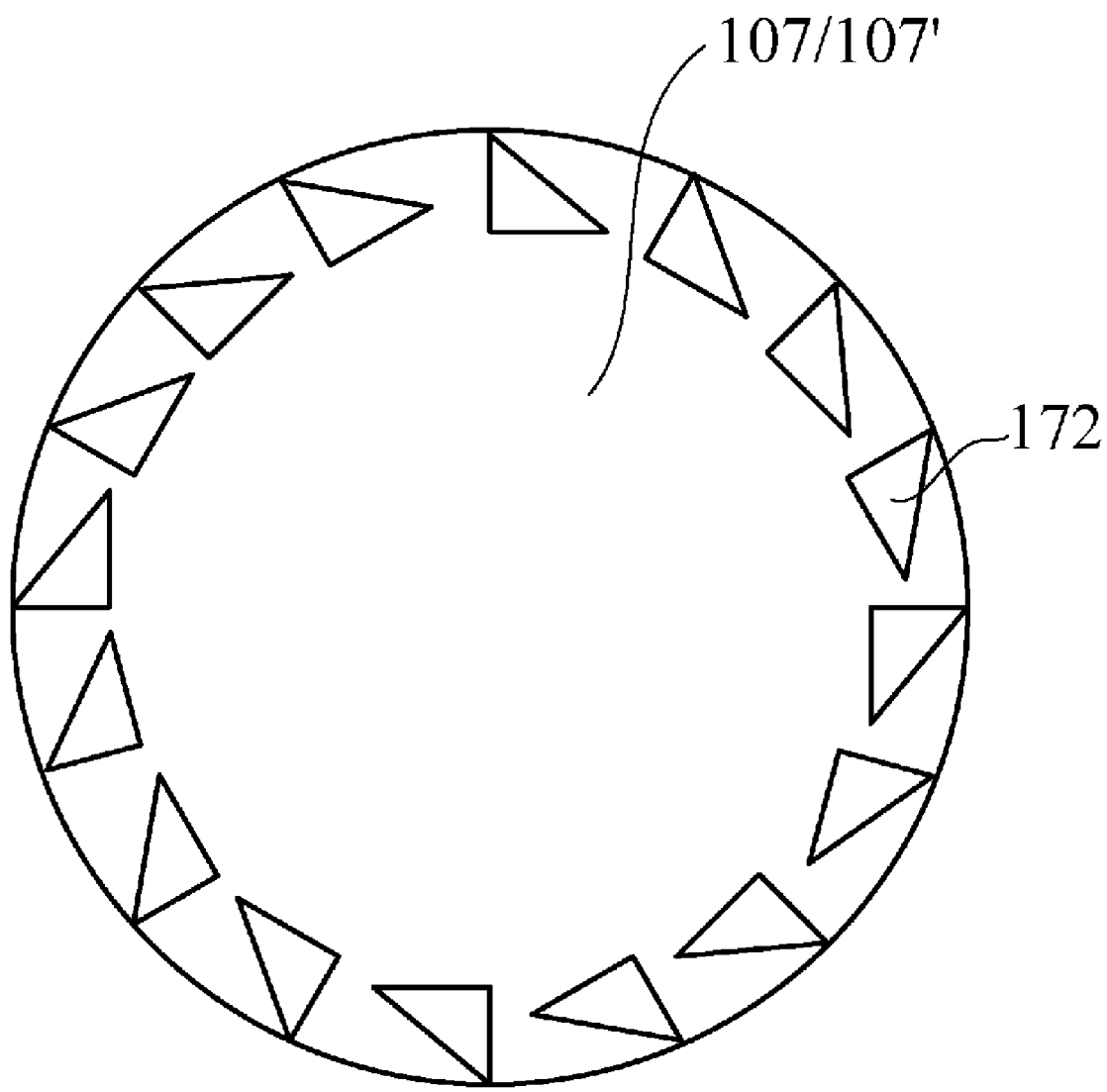
FIG. 6 is a schematic diagram showing the encoder disk of FIG. 1 in accordance with a third embodiment.

In other embodiments, the through holes 172 of the encoder disk 107/107' may have other shapes, such as a pentagonal (referring to FIG. 5), or a triangular (referring to FIG. 6).

In other embodiments, the encoder disk 107', the electromagnetic signal generator 109', and the induced signal generator 111' may be omitted. The ball mouse 100 may be used as a pointing device that functions by detecting one-dimensional motion relative to its supporting surface.

The above described ball mouse 100 operates based on a principal of electromagnetic induction, its operation will not be affected when the through holes 172 accumulates lint or dust over time.

It is to be further understood that even though numerous characteristics and advantages of the present embodiments have been set forth in the foregoing description, together with details of the structures and functions of the embodiments, the disclosure is illustrative only; and changes may be made in detail, especially in matters of shape, size, and arrangement of parts within the principles of the present disclosure to the full extent indicated by the broad general meaning of the terms in which the appended claims are expressed.

What is claimed is:

1. A ball mouse, comprising:
   a ball;
   two metallic encoder disks each defining a plurality of through holes;
   two drive rollers engaged with the ball and transferring motion of the ball to respective encoder disks;
   two electromagnetic signal generators for generating two electromagnetic signals, and the electromagnetic signal generators each comprising a primary winding; and
   two induced signal generators for discontinuously generating two induced signals according to respective electromagnetic signals, and the induced signal generators each comprising a secondary winding, the primary winding and the secondary winding composing a transformer;
   wherein one of the two electromagnetic signals is transmitted to one of the induced signal generators through the plurality of through holes of one of the encoder disks, and the other of the two electromagnetic signals is transmitted to the other of the induced signal generators through the plurality of through holes of the other of the encoder disks.

2. The ball mouse of claim 1, wherein the two induced signals are two discontinuous electromagnetic signals, a motion rate of the ball mouse is determined according to frequencies of the discontinuities of the two induced signals.

3. The ball mouse of claim 1, wherein a radial width of the through holes changes along a circumference of each of the two encoder disks.

4. The ball mouse of claim 3, wherein the plurality of through holes are evenly distributed along the circumference.

5. The ball mouse of claim 1, further comprising a circuit board for converting the induced signals into electrical signals.

6. The ball mouse of claim 5, wherein the circuit board comprises:
   a controller for generating a drive signal;
   a signal detecting unit for extracting the induced signals from the induced signal generators; and
   a processing unit for converting the induced signals into electrical signals;
   wherein the electromagnetic signal generators continuously generate the electromagnetic signals according to the drive signal.

7. The ball mouse of claim 1, wherein the two primary windings are connected in series, and the two secondary windings are separate.

8. The ball mouse of claim 1, wherein a length of each of the secondary windings is equal to or longer than a maximum radial width of the through holes, and a length of each of the primary windings is equal to or shorter than a minimum radial width of the through holes.

9. A ball mouse, comprising:
   a ball;
   a metallic encoder disk defining a plurality of through holes and driven by the ball to rotate when the ball rotates;
   an electromagnetic signal generator for generating an electromagnetic signal and the electromagnetic signal generator comprising a primary winding; and
   an induced signal generator for discontinuously generating an induced signal according to the electromagnetic signal, the electromagnetic signal generator and the induced signal generator disposed at opposite sides of the encoder disk, and the induced signal generator comprising a secondary winding, the primary winding and the secondary winding composing a transformer;
   wherein the electromagnetic signal is transmitted to the induced signal generator through the plurality of through holes of the encoder disk.

10. The ball mouse of claim 9, wherein the induced signal is a discontinuous electromagnetic signal, a motion rate of the ball mouse is determined according to a frequency of the discontinuity of the induced signal.

11. The ball mouse of claim 9, wherein a radial width of the through holes is variable along a circumference of the encoder disk.

12. The ball mouse of claim 11, wherein the plurality of through holes are evenly distributed along the circumference of the encoder disk.

13. The ball mouse of claim 9, further comprising at least two rollers gripping the ball and driven thereby to rotate when the ball rotates; the metallic encoder disk is fixed to one of the at least two rollers.

14. The ball mouse of claim 9, further comprising a circuit board for converting the induced signal into an electrical signal.

15. The ball mouse of claim 14, wherein the circuit board comprises:

a controller for generating a drive signal;
a signal detecting unit for extracting the induced signal from the induced signal generator; and
a processing unit for converting the induced signal into the electrical signal;
wherein the electromagnetic signal generator continuously generates the electromagnetic signal according to the drive signal.

16. The ball mouse of claim 9, wherein a length of the secondary winding is equal to or longer than a maximum radial width of the through holes, and a length of the primary winding is equal to or shorter than a minimum radial width of the through holes.

* * * * *